United States Patent [19]

Spencer

[11] Patent Number: 5,397,553
[45] Date of Patent: Mar. 14, 1995

[54] METHOD AND APPARATUS FOR SEQUESTERING CARBON DIOXIDE IN THE DEEP OCEAN OR AQUIFERS

[75] Inventor: Dwain F. Spencer, Half Moon Bay, Calif.

[73] Assignee: Electric Power Research Institute, Inc., Palo Alto, Calif.

[21] Appl. No.: 956,520

[22] Filed: Oct. 5, 1992

[51] Int. Cl.$^6$ .............................................. B01D 7/00
[52] U.S. Cl. .................................. 422/243; 48/190
[58] Field of Search .................. 422/243, 211; 55/68; 48/190

[56] References Cited

U.S. PATENT DOCUMENTS

| | | | |
|---|---|---|---|
| 3,690,040 | 9/1972 | Halfon | 55/68 |
| 3,928,145 | 12/1975 | Othmer | 210/152 |
| 3,975,167 | 8/1976 | Nierman | 48/190 |
| 4,055,145 | 10/1977 | Mager et al. | 165/45 X |
| 4,134,732 | 1/1979 | Jackson | 422/211 X |
| 4,235,607 | 11/1980 | Kinder et al. | 55/68 |
| 4,349,068 | 9/1982 | Coury | 165/1 |
| 4,883,423 | 11/1989 | Holowczenko | 431/328 |
| 4,930,319 | 6/1990 | Bee et al. | 62/69 |
| 5,003,186 | 3/1991 | Chang et al. | 250/505.1 |
| 5,044,164 | 9/1991 | Bee | 62/46.1 |
| 5,086,620 | 2/1992 | Spears | 62/51.1 |
| 5,107,006 | 4/1992 | Saito | 556/132 |
| 5,110,990 | 5/1992 | Blessing et al. | 568/454 X |
| 5,143,007 | 9/1992 | Laukien et al. | 114/15 |

FOREIGN PATENT DOCUMENTS 164419 7/1991 Japan.
11920 1/1992 Japan.

OTHER PUBLICATIONS

Electric Power Research Institute Report No. IE-7365, "Engineering and Economic Evaluations of $CO_2$ Removal from Fossil Fuel Power Plants", Jun. 1991, vols. 1 and 2.
Nishikawa N et al, "Carbon Dioxide Clathrate Formation and Its Properties in the Simulated Deep Ocean", Mar. 4-6, 1992, IEA International Conference, Amsterdam, Netherlands.
Sema T, "Research Program on Carbon Dioxide Removal, Recovery, and Disposal", Proceedings Nov. 6-8, 1991, IEA International Conference, Kyoto Japan.
Stegen G, "Sequestering $CO_2$ in the Ocean", Nov. 6-8, 1991, IEA International Conference, Kyoto Japan.
Saji A et al, "Fixation of Carbon Dioxide by Clathrate-Hydrate", Mar. 4-6, 1992, IEA International Conference, Amsterdam, Netherlands.
Austvik T et al, "Deposition of $CO_2$ on the Seabed in the Form of Hydrates", 1992, Energy Conver. Mgmt., vol. 33, No. 5-8, pp. 659-666.
Golomb D et al, "The Fate of $CO_2$ Sequestered in the Deep Ocean", 1992, Energy Conver. Mgmt., vol. 33, No. 5-8, pp. 675-683.

*Primary Examiner*—Robert J. Warden
*Assistant Examiner*—E. Leigh Dawson
*Attorney, Agent, or Firm*—Laurence Coit

[57] ABSTRACT

Disclosed is a system for sequestering carbon dioxide by combining sub-cooled carbon dioxide gas phase and liquid water (fresh or salt) in a reactor to form carbon dioxide clathrates in a continuous process at pressures from 3 to 20 atmospheres. The seawater feed for the clathrate reactor is pumped to the surface from a depth of approximately 1000 meters. A slip stream of the reactor feed water is used to pre-cool the carbon dioxide gases. The pre-cooled gaseous, or liquid carbon dioxide and the reactor surfaces are then sub-cooled by refrigeration to temperatures of $-40°$ C. to $0°$ C., which is typically only $5°$ to $45°$ C. below ambient sea water temperatures at depths of 1000 meters. Forming clathrates in this manner is considerably less energy-intensive than $CO_2$ compression and liquefaction at high pressures.

9 Claims, 2 Drawing Sheets

METHOD AND APPARATUS FOR SEQUESTERING CARBON DIOXIDE IN THE DEEP OCEAN OR AQUIFERS

BACKGROUND OF THE INVENTION

1. Field of the Invention

This invention relates to a method and apparatus for removing carbon dioxide from power plant emissions or from the general atmospheric environment and sequestering it in the deep ocean. More particularly, the invention relates to a method and apparatus for producing carbon dioxide clathrates which can be deposited in the deep ocean thereby sequestering the carbon dioxide for 500 years or more.

2. Description of Related Art

There is presently a growing concern that continued unabated emissions of carbon dioxide may lead to a global temperature rise or other climatic change. One of the methods to control carbon dioxide emissions is to separate the carbon dioxide from power plant or other flue gases and pump the carbon dioxide at a high pressure into the ocean below the thermocline. This has been shown to be a very energy-intensive and costly process due to the large gas compression energy losses.

An alternate approach is to dispose of carbon dioxide in the oceans by liquefying the carbon dioxide and pumping it to depths greater than 1000 meters. This is also very energy-intensive and costly. Still others have discussed the formation of carbon dioxide clathrates at ambient sea-water temperatures and pressures greater than 40 atmospheres, and/or as high as 100 atmospheres by combining sea water with liquid carbon dioxide at temperatures of 5° to 10° C. Again, this is a very energy-intensive approach and economically unattractive.

Therefore, it is apparent that what is needed is a simple and energy efficient method of sequestering carbon dioxide in the deep ocean.

SUMMARY OF THE INVENTION WITH OBJECTS

One object of the present invention is to provide an energy efficient method and apparatus to sequester carbon dioxide in the deep ocean.

Another object of the present invention is to provide a cycle for carbon dioxide sequestration which utilizes the cold of deep ocean waters to promote carbon dioxide clathrate formation.

Still another object of the present invention is to form carbon dioxide clathrates for sequestration without having to use refrigeration for all of the sub-cooling of the carbon dioxide and thereby saving a significant portion of the refrigeration energy which would otherwise be required to accomplish said clathrate formation.

Yet one more object of the present invention is to form carbon dioxide clathrates for sequestration without having to compress said carbon dioxide to high pressures and thereby expend the energy necessary for said compression.

These and other objects are accomplished in a system which uses sub-cooled carbon dioxide gas phase and liquid water (fresh or salt) in a reactor to form carbon dioxide clathrates in a continuous process at pressures from 3 to 20 atmospheres. The seawater feed for the clathrate reactor is pumped to the surface from a depth of approximately 500 to 1000 meters. A slip stream of the reactor feed water is used to pre-cool the carbon dioxide gases. The pre-cooled gaseous, or liquid, carbon dioxide and the reactor surfaces are then sub-cooled by refrigeration to temperatures of −40° C. to 0° C., which is typically only 5° to 45° C. below ambient sea water temperatures at depths of 500 to 1000 meters. Forming clathrates in this manner is considerably less energy-intensive than $CO_2$ compression and liquefaction at high pressures.

The reactor may either be submerged in the ocean at some depth less than 1000 meters or operated on the surface of the ocean by pumping deep ocean water (from 500 meters to 1000 meters or so) into the reactor and returning clathrates directly or newly (partially) dissolved clathrates to depth with unreacted sea water.

DETAILED DESCRIPTION OF THE PREFERRED EMBODIMENT

Clathrate compounds are combinations of compounds in which one compound is caged within the lattice structure of another compound. Carbon dioxide clathrates may be formed from a water "lattice" of 46 $H_2O$ molecules at pressures greater than 40 atmospheres and temperatures below 10° C. The number of carbon dioxide molecules enclosed in this lattice may vary from 1 to 8 depending on the formation conditions. Most data indicate that the number of carbon dioxide molecules trapped in the lattice depends primarily on the operating pressures, higher pressures increasing the number of molecules trapped.

The primary determinant of the amount of carbon dioxide trapped in either fresh or sea water will be both the ambient temperature and pressure (T, P) conditions and relative mole fractions of carbon dioxide and water present. $CO_2$ clathrates of various levels of stability and volume fractions of crystals or granules have been produced with mole fractions of $CO_2$ varying from 0.05 to 0.52 in batch tests conducted at high pressure by admixing water with gaseous $CO_2$ at approximately 6° C. These have been produced with various levels of agitation provided by a glass rod which is enclosed in the reaction section. From the phase diagram for $CO_2$, water, and hydrate, similar clathrate formation conditions exist for a sub-cooled mixture of $CO_2$ (gas) and water at pressures as low as 3 atmospheres, with temperatures of −30° C. If liquid water and sub-cooled gaseous $CO_2$ are simultaneously sprayed into a sub-cooled low pressure reactor, stable solid $CO_2$ clathrates will form and be deposited in the reactor. Formation of clathrates under these conditions allows for sequestration of carbon dioxide in the deep ocean regions for long periods of time.

Figure 1:
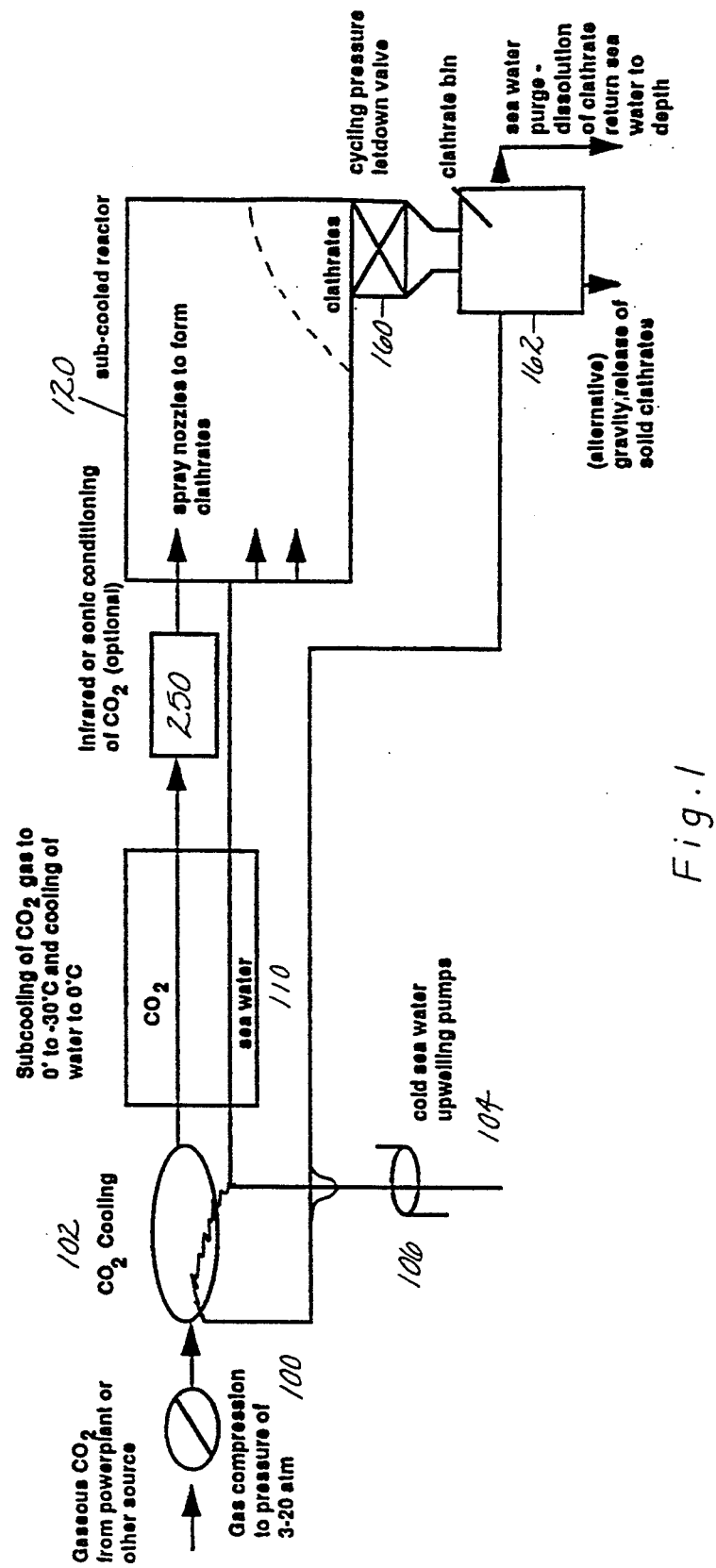
FIG. 1 is a flow chart showing the overall cycle for the carbon dioxide cooling and conditioning, and the clathrate formation, removal, and sequestration system.

Referring now to FIG. 1, a flow diagram for the present invention is depicted. In the process, gaseous carbon dioxide produced from the combustion of fossil fuel in a power plant or other fuel burning or energy conversion facilities is fed to compressor 100. Compressor 100 can be of any conventional design including positive displacement or centrifugal compressors capable of compressing the gas to pressures between 3 and 20 atmospheres. The compressed carbon dioxide gas is then routed to heat exchanger 102. Heat exchanger 102 is of the conventional shell and tube, or plate type and receives cooling water from deep pipe 104. Deep pipe 104 draws suction from fresh or sea water from a depth of approximately 500 to 1000 meters. Pump 106 delivers water from deep pipe 104 to heat exchanger 102. In a parallel manner, pump 106 supplies water to the refrigeration unit 110. Water further cooled by the refrigeration unit 110 in this manner is later used as feed water for a clathrate reactor.

Sea water brought from a depth of 500 to 1000 meters is generally at a temperature of about 0° C. to 10° C., and more typically is approximately 5° C. Heat transfer from the compressed carbon dioxide to the sea water results in the carbon dioxide being cooled to approximately 10° C. At this point, the cooled carbon dioxide gas is fed to refrigeration unit 110. Refrigeration unit 110 can be a typical vapor compression or adsorption type unit. The refrigeration unit cools both the compressed carbon dioxide and the sea water delivered to the refrigeration unit from the deep pipe 104.

The carbon dioxide gas temperature is reduced to between 0° C. and −30° C. by the refrigeration unit 110. At the same time, the feed water is cooled to approximately 0° C. Both the carbon dioxide gas and the feed water are routed to clathrate reactor 120.

Figure 2:
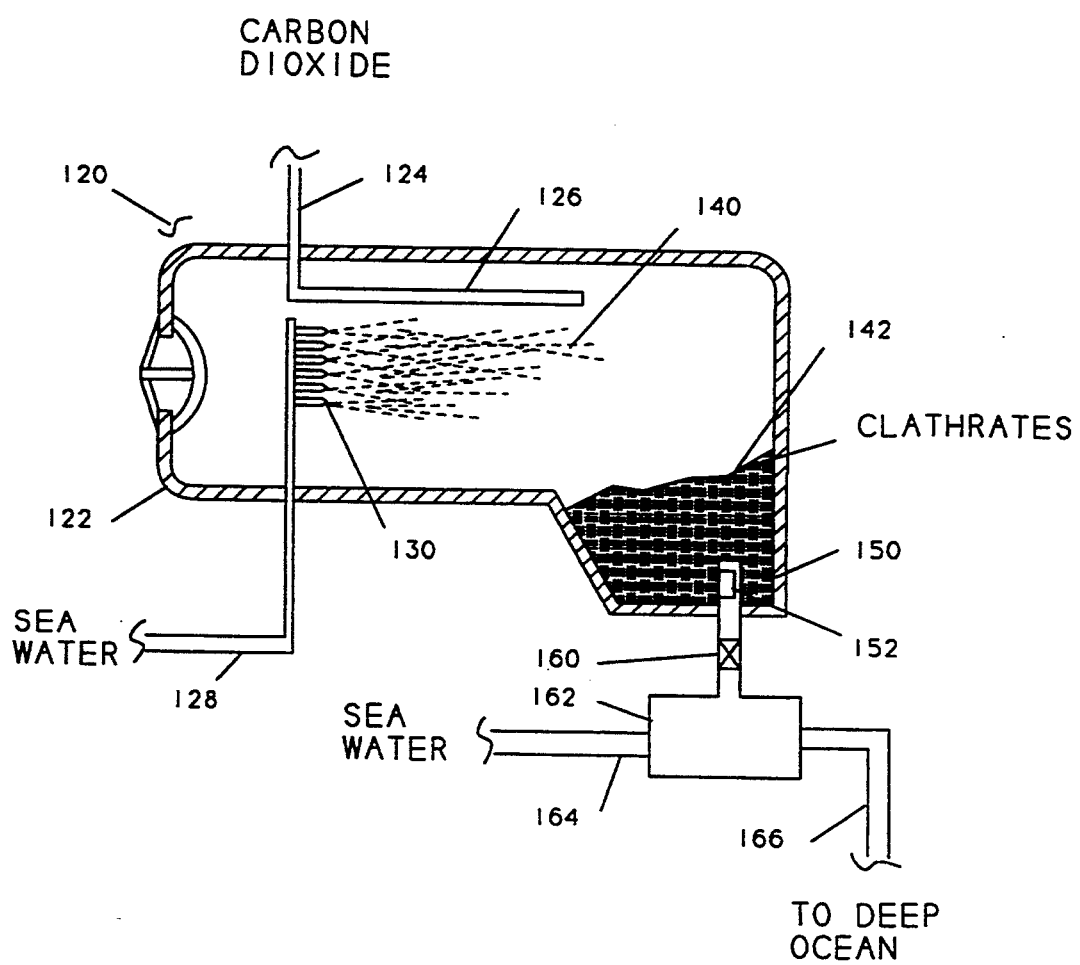
FIG. 2 is a section view of the clathrate reactor used in practicing the present invention.

Turning now to FIG. 2, a cross section view of the clathrate reactor is depicted. The clathrate reactor 120 is a pressurized cylinder 122 suitable for mixing the sub-cooled carbon dioxide gas and sea water under the necessary conditions to form clathrates. Although the reactor 120 is depicted as a cylinder, it is readily understood that its overall dimensions can take on other shapes such as a sphere or rectangular box. Sub-cooled carbon dioxide is fed to the reactor 120 by pipe 124 which connects to diffuser 126 mounted internal to vessel 122. Diffuser 126 contains a plurality of holes (not shown) which serve to distribute the carbon dioxide gas evenly within the reactor 120. Sub-cooled sea water is brought to the reactor 120 by pipe 128. Pipe 128 feeds a plurality of spray nozzles 130 which direct a sea water spray across the carbon dioxide gas being released by diffuser 126. Although the nozzle orientation depicted in this figure is cross-flow, counter-flow nozzles can be used to advantage. As the carbon dioxide and sea water react under the favorable pressure and temperature conditions maintained in the reactor 120, clathrates 140 are formed and accumulate in a mound 142 in hopper 150. To further promote the formation of clathrates, reactor 120 can be cooled by refrigeration unit 110. Cooling of reactor 120 assists in maintaining a stable operating condition for continuous clathrate formation.

The clathrates are removed from reactor 120 through nozzle 152. When valve 160 is opened, clathrates from mound 142 flow into mixing chamber 162. Sea water fed to chamber 162 by pipe 164 flushes the clathrates through discharge pipe 166 to the deep ocean. The deposited material may be removed with a cycling pressure letdown system such as a pressure lock system which is known in the art.

The clathrates will either be released as solids into the ocean at a specified depth to ensure carbon dioxide sequestration or pumped and dissolved in deep ocean water which has been upwelled to form the clathrates and acts as a carrier to return the clathrates or partially dissolved clathrates to depths between 500 and 1000 meters.

Although the system described sequesters carbon dioxide in the ocean, the same system can be used to sequester $CO_2$ in cold, underground fresh water aquifers in a similar manner, as clathrates form equally well in fresh or salt water.

The clathrate formation conditions are also dependent on the rotational orientation of the carbon dioxide molecules relative to the 46 water molecules with which they interact. Various methods are available to optimize rotational orientation and thereby improve the packing density of carbon dioxide. Referring back to FIG. 1, options to improve molecular interaction such as sonic or infrared preconditioning of the carbon dioxide gas are shown in box 250. The reactor may include other methods to catalyze or enhance the reaction rates of the carbon dioxide water reaction including swirl or co-axial nozzles to enhance contact between the low-pressure gaseous carbon dioxide and water, clathrate crystal recycle to "seed" the clathrate formation, or selected metallic surfaces to further catalyze the reactions.

The packing density of $CO_2$ into the water matrix; i.e., the optimum $CO_2$ mole fraction fixed in the lattice, is important to the longevity of the sequestration of the carbon dioxide. This increased packing density increases the specific gravity of the clathrates to levels greater than that of sea water; i.e., 1.1 gm/cc. Once these highly packed clathrates are formed and returned to the ocean at significant depth, they will sink by gravity toward the ocean floor. Of course, dissolution of the clathrates in the open ocean or in fresh-water systems will occur at some rate. Thus, final sequestration in the oceans or deep water aquifers may either be in the form of clathrates (which form naturally on the ocean floor) or as dissolved clathrates, which increase the bicarbonate concentration of cold sea water. In either case, once the carbon dioxide is "deposited" below 1000 meters, it has greater than a 500-year lifetime in the ocean, and is considered to be sequestered.

Therefore, the overall invention is this entire system for carbon dioxide sub-cooling, clathrate formation, transfer, and discharge at depth in the ocean or in cold-water aquifer systems. The invention focuses on the continuous reactor for reacting gaseous carbon dioxide and water to form solid $CO_2$ clathrates, as well as the use of deep ocean water to form and transport the clathrates to depth.

Having thus described an exemplary embodiment of the invention, it is understood that those skilled in the art may modify or change the details of implementing the invention without departing from the spirit and scope of the invention as defined in the following claims.

I claim:

1. A system for sequestering carbon dioxide in deep water comprising:
   a. a source of gaseous carbon dioxide;
   b. a source of seawater at a depth of greater than 500 meters and a temperature of about 0° to 10° C.
   c. a compressor in fluid communication with said gaseous carbon dioxide for compressing said carbon dioxide;
   d. a heat exchanger in fluid communication with said compressor for receiving and precooling said compressed carbon dioxide;
   e. a refrigeration unit in fluid communication with said heat exchanger for receiving and subcooling said precooled, compressed carbon dioxide to at temperature between approximately 0° C. and −30° C.;

e. a clathrate reactor vessel in fluid communication with said refrigeration unit for receiving said subcooled carbon dioxide from said refrigeration unit;

f. means for transporting and splitting said cold seawater into first and second streams, said first stream to feed said clathrate reactor for production of clathrates and said second stream for precooling said carbon dioxide and transporting said clathrates as a slurry to depths greater than 500 meters;

g. means for mixing said subcooled carbon dioxide and said seawater in said clathrate reactor vessel thereby forming clathrates; and h. means for transporting said clathrates to a depth greater than 500 meters in said seawater;

whereby said seawater is used to precool gaseous carbon dioxide which is then subcooled and mixed with cold seawater to form clathrates which are deposited in the deep water at a depth greater than 500 meters to sequester said carbon dioxide.

2. A system for sequestering carbon dioxide in deep water as recited in claim 1 wherein said reactor uses cross-flow nozzles to mix said carbon dioxide and said water.

3. A system for sequestering carbon dioxide in deep water as recited in claim 1 wherein said reactor uses counter-flow nozzles to mix said carbon dioxide and said water.

4. A system for sequestering carbon dioxide in deep water as recited in claim 1 wherein said subcooled carbon dioxide gas is sonically preconditioned before it is admitted to said reactor.

5. A system for sequestering carbon dioxide in deep water as recited in claim 1 wherein said subcooled carbon dioxide gas is preconditioned with infrared radiation before it is admitted to said reactor.

6. A system for sequestering carbon dioxide in deep water as recited in claim 1 wherein said means for transporting said clathrates from said reactor further comprise a pressure lock chamber.

7. A system for sequestering carbon dioxide in deep water as recited in claim 1 wherein said means for transporting said clathrates into deep water further comprise a deep water discharge pipe with circulating seawater flowing therethrough, said pipe connected to a mixing chamber receiving said clathrates whereby said clathrates mix with said flowing circulating seawater and are carded to deep water for discharge.

8. A system for sequestering carbon dioxide in deep water as recited in claim 7 wherein said circulating water is supplied from said second stream of incoming seawater after flowing through said heat exchanger, 9. A system for sequestering carbon dioxide in deep water as recited in claim 1 further comprising means for transporting said first stream of seawater to said refrigeration unit for subcooling said seawater to approximately 0° C. and means for transporting said subcooled seawater from said refrigeration unit to said reactor whereby subcooled carbon dioxide and subcooled seawater are mixed in said reactor to form clathrates.

* * * * *